Oct. 9, 1962　　　　G. H. MURRAY　　　3,056,967
FASTENER DRIVING TOOL
Filed March 2, 1961　　　　　　　　　　　　3 Sheets-Sheet 1
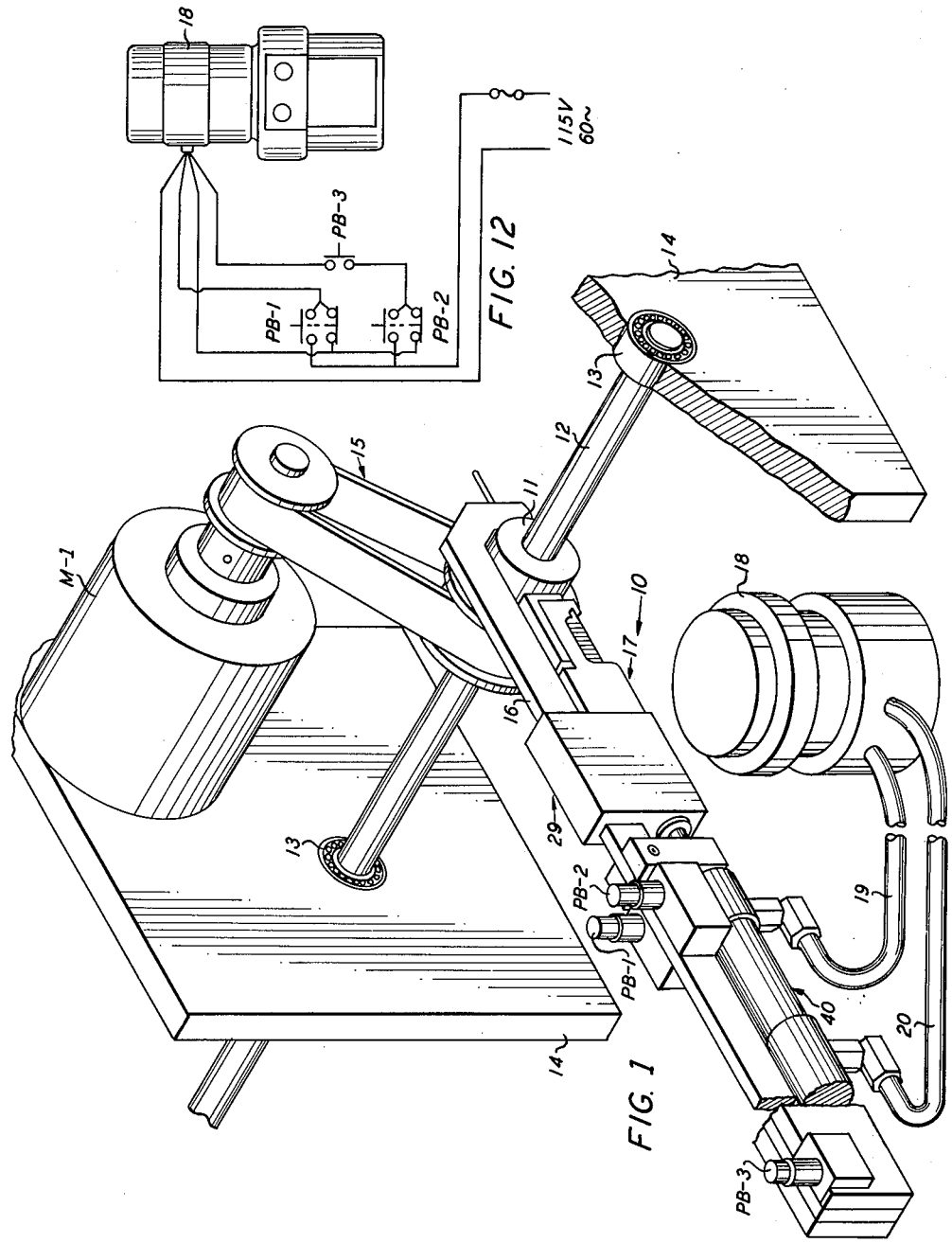
INVENTOR.
GEORGE H. MURRAY
BY
ATTORNEY

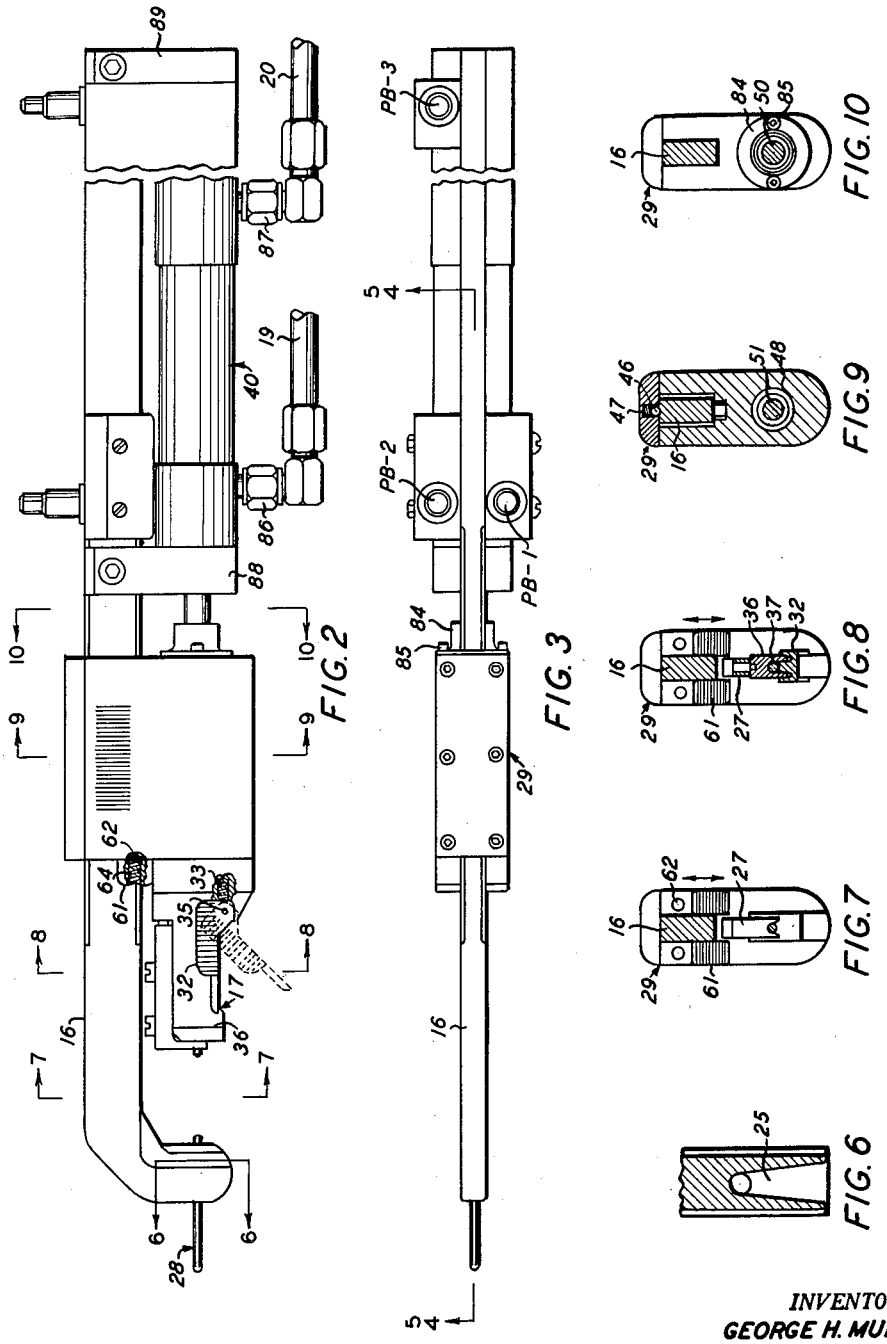

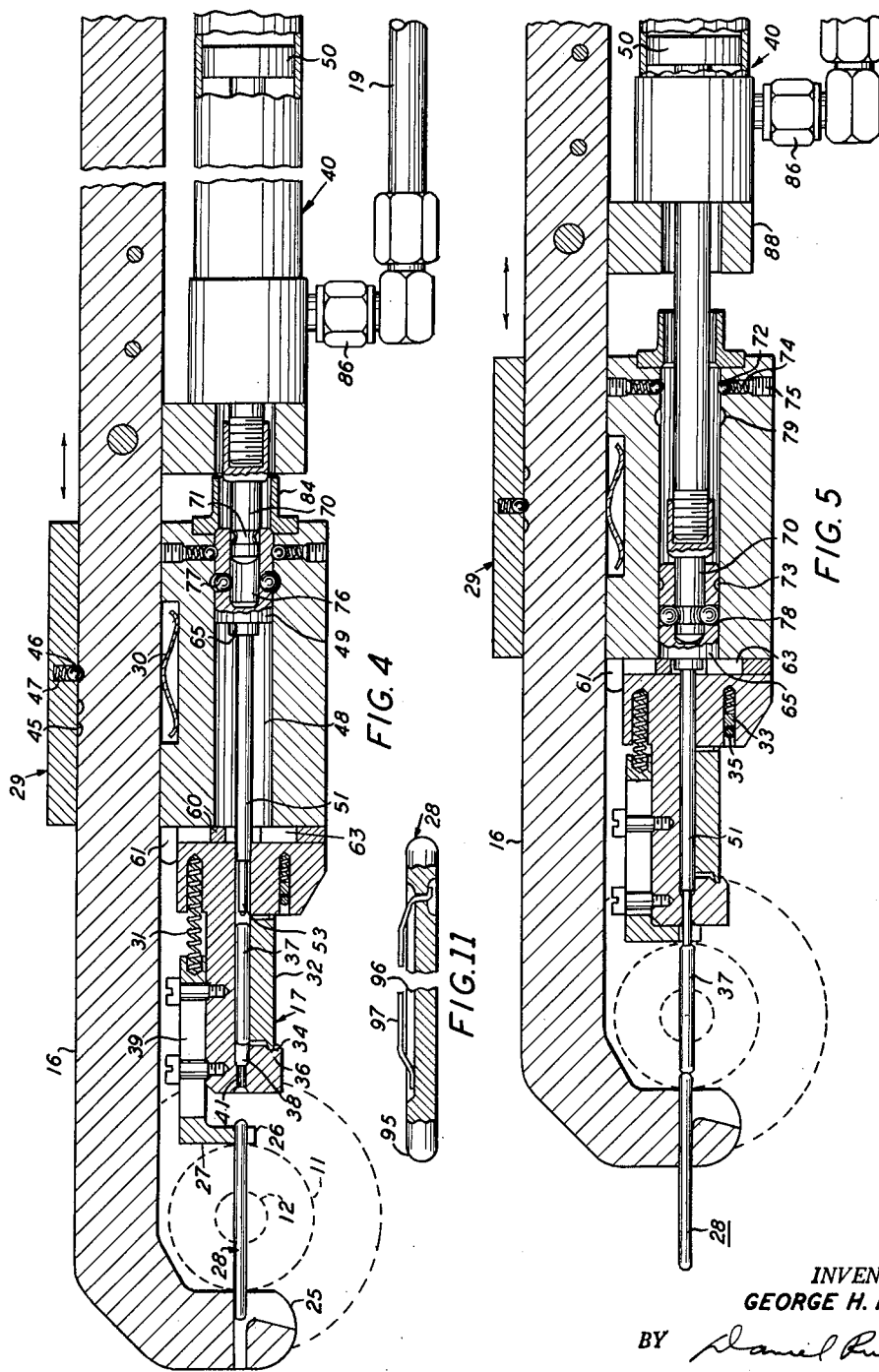

United States Patent Office 3,056,967
Patented Oct. 9, 1962

3,056,967
FASTENER DRIVING TOOL
George H. Murray, Rochester, N.Y., assignor to Xerox Corporation, Rochester, N.Y., a corporation of New York
Filed Mar. 2, 1961, Ser. No. 92,871
11 Claims. (Cl. 1—345)

This invention relates to machine tools and in particular to a machine tool to effect assembly of machine parts by fastening. More specifically, the invention relates to a machine tool adapted to drive a pin or other elongated fastener for securing wheels, gears, pulleys, levers or the like to a shaft whereby to prevent relative movement between the rotating member and the shaft or spindle on which they are mounted.

It is usual in connecting machine parts in assembled relation to use fasteners of various types and for securing a member onto a rotatable shaft it is common to use an elongated fastener such as a key or pin each available in a variety of forms and types as is well known in the art. Conventional practice for inserting or driving the fastener is dependent on the nature of the fit of the fastener in the slot or hole into which it is driven and the fit usually is a function of the class of use to which the connected parts are to be subjected. For example, fasteners can be inserted loose or free-fit by hand or light tapping in which case they are usually retained in place by a set-screw or the like set in the hub of the member being secured. These fits are usually employed where parts are expected to be replaced or interchanged and where great accuracy of fit is not essential. On the other hand, tight or medium force fits sometimes referred to as "compressed" fits are usually used for permanent assembly and for which a form of pin fastener is frequently used in preference to a key.

Driving of a pin fastener into the provided openings under tight or force fits may require the application of considerable force in the driving direction. Conventionally, the required force is provided by one of various lever mechanisms offering a high mechanical advantage such as an arbor press, parallel-jawed pliers, C-clamp or the like, or pounding with a hammer may be resorted to. These may be either power operated or hand operated.

Where the assembly of a shaft and rotating member can be sub-assembled as a sub-component, i.e., fastened in advance of assembly to the main or primary assembly, fastening can usually be effected by using suitable jigs and fixtures for supporting the parts in place and applying the required force to the fastener by an arbor press or the like as aforesaid. Frequently, however, it is not conveniently possible to pre-assemble these parts because of physical limitations occasioned by previous assembly. For example, in an assembly where a rotating shaft is to be supported between closely adjacent pre-assembled parallel castings with the rotating member inbetween, it is usually necessary to pass the shaft through one casting first and then slip the rotating member onto the shaft before the shaft is passed through the second casting. This situation places a severe handicap on the fastening operation in that the operation must be carried out in a work area of restricted accessibility. An arbor press, in this instance, is virtually impossible to use, a C-clamp is cumbersome and tends to bend the fastener, parallel-jawed pliers are difficult to operate, and pounding produces excessive forces on the bearing supports that have been found to deform the shaft an amount to destroy its true concentricity.

Now in accordance with the invention there is provided a novel tool apparatus adapted to drive fasteners into a force fit connection and which is easily operable even under conditions of limited accessibility. The apparatus is effective to draw the fastener without the application of eccentric pressures on the shaft or supporting member and without bending or deforming the fastener. The apparatus in its preferred embodiment is portable for bringing to the work area.

It is therefore the principal object of the invention to provide novel tool apparatus adapted to drive elongated fasteners into machine parts to be connected.

It is another object of the invention to provide novel tool apparatus to effect fastening of rotating members to a shaft, spindle or the like.

It is still another object of the invention to provide a novel tool apparatus for driving fasteners in a force fit into machine parts without impairing the utility of the fastener or supporting members of the parts to be connected.

It is still another object of the invention to provide a novel tool apparatus for driving elongated fasteners that is portable and operable in work areas of limited accessibility.

These and other objects are attained in accordance with the tool apparatus of the invention which in a preferred embodiment comprises a body formed of an elongated shank that can be gripped for handling and which includes a magazine for loading a pin fastener into an ejection barrel, a jaw-like portion between the magazine and an end of the shank to partially encompass the machine parts, means to support the jaw-like portion in position aligning the open end of the ejection barrel with the pre-aligned fastener openings of the parts to be connected, and a hydraulically actuated ram reciprocally operative on the barrel to eject the fastener from the barrel and drive it into the pre-aligned fastener openings. The tool may be either stationary or portable, the latter of which represents the preferred embodiment.

An understanding as well as the advantages of the present invention will become apparent to those skilled in the art from a reading of the following detailed description in connection with the accompanying drawings in which:

FIG. 1 isometrically illustrates the tool of the invention in a typical fastening position to a sub-component assembly;

FIG. 2 is a side elevation of the apparatus;

FIG. 3 is a plan view of the apparatus;

FIG. 4 is a side sectional view taken substantially along lines 4—4 of FIG. 3 and illustrates the component parts of the apparatus in a pre-driving position;

FIG. 5 is a side sectional view similar to FIG. 4 illustrating the post-driving position of the component parts;

FIG. 6 is a fragmented sectional view taken substantially along lines 6—6 of FIG. 2;

FIG. 7 is a sectional view taken substantially along lines 7—7 of FIG. 2;

FIG. 8 is a sectional view taken substantially along lines 8—8 of FIG. 2;

FIG. 9 is a sectional view taken substantially along lines 9—9 of FIG. 2;

FIG. 10 is a sectional view taken substantially along lines 10—10 of FIG. 2;

FIG. 11 is a side view partially in section through a locating pin used with the apparatus of the invention; and FIG. 12 is a schematic electrical diagram.

Referring to FIG. 1 the fastening tool of the invention, generally designated 10, is illustrated in operative position, in what might be regarded as a typical fastening relation in which the tool of the invention has preferred utility. As shown, the tool is in position for connecting a sheave 11 to a shaft 12 mounted for rotation in a pair of bearings 13 and adapted to be rotated from the pulley arrangement 15 driven by motor M–1. The bearings 13 are supported in a pair of parallel, closely spaced castings 14 that for illustrative purposes are considered to have been pre-assembled in this relation. In order to mount the sheave on the shaft, the shaft has been passed first through the bearing or bearing cavity of one casting after which the sheave has been slipped thereon before the shaft is passed into the cavity of the opposite casting. This leaves the sheave yet to be fastened to the shaft and which is effected by the tool apparatus of the invention in the manner to be described.

The tool generally is comprised of a body formed of an elongated shank 16 on which there is a magazine 17 in which to load fasteners to be driven, a cartridge 29 for advancing the magazine into driving or fastening position, and a hydraulic unit 40 that provides the necessary driving force for operating a ram which ejects a fastener from the magazine into pre-aligned holes adapted to receive the fastener in the parts to be connected.

Throughout the specification reference will be made to movement of various components that will be referred to as "forward" and "retracted" by which it is intended to respectively describe movement toward or away from the relative position occupied by machine parts to be connected when in fastening position in the jaw of the tool as will be understood.

As can be seen, the tool in FIG. 1 is adapted to mount over the sheave 11 in a jaw portion formed between the hook-end of elongated shank 16 and the magazine 17 loaded with a fastener that is to be driven into pre-aligned holes of the sheave and shaft. The apparatus can be adapted to accommodate elongated fasteners having any of a variety of cross-sectional shapes and in the particular embodiment described is adapted to drive pin fasteners of substantially cylindrical cross-section. One type of pin found particularly suitable for use with the apparatus is a rolled type cylindrical pin of wound spring steel having slightly chamfered ends and marketed by the C.E.M. Company of Danielson, Conn., under the tradename of Spirol Pin. This pin is adapted to be compressed in cross-section while being driven and re-expands to forcibly fit the diameter of perimeter of the holes or slots of the machine parts into which it is driven.

Tool operation is controlled by push buttons PB–1 and PB–2 that when separately actuated operate the tool in opposite directions by reversing the operation of hydraulic pump 18. Either PB–1 or PB–2 must be actuated in conjunction with pushbutton PB–3 located relatively remote therefrom. By remote separation of the pushbuttons in this manner, both hands of the operator must be occupied to prevent him from inadvertently placing his hand or digits in the path of moving parts that exert pressures on the order of 600 p.s.i.g. Actuating the pushbuttons as aforesaid energizes hydraulic pump 18, which is a type marketed by Oil Dyne Inc. of Chicago, Illinois, being their standard model number Carat–3. The pump is connected to the tool through hydraulic hoses 19 and 20 and when either PB–1 or PB–2 is actuated in series with PB–3 hydraulic pressure is applied through the hoses to operate the tool.

Referring now more particularly to FIGS. 2–10, shank 16 extends substantially the entire tool length and directly or indirectly provides support for all the components thereof. The shank terminates at one end in a hook portion which on the inside of the hook contains a V-shaped opening 25 extending upward from the central bottom portion. The opening terminates at its top in a rounded cove shape which is drilled through to the outside of the hook. The top of this opening is aligned with the top of a similar shaped opening 26 in a slide 27 movably secured through a slot 39 onto magazine 17 and urged forward by a compressed spring 31. The two openings position the tool in fastening relation to the machine parts by straddling the parts and resting or gripping onto an alignment or locating pin 28, to be described that has been manually pre-inserted through the fastener holes of the parts into which the pin is to be driven.

Magazine 17 is secured to cartridge 29 and includes a gate 32 that is urged forward by a spring 33 until its forwardmost lip engages a groove 34 in guide 36. By retracting the gate until it is free of the groove, it can be swung out about hinge 35 to a position shown dashed in FIG. 2 and a fastener pin 37 then loaded therein. Closing the gate supports the pin fastener firmly in a barrel 38 formed between the gate and guide and having a diameter substantially the same or only perceptibly larger than that of the pin. When using a compressible pin of the type described, the exit portion of barrel 38, separately designated 41 and aligned axially with the top of opening 26, has a reduced diameter less than the uncompressed diameter of the pin such that the pin on ejection emerges slightly compressed.

Cartridge 29 is slidably supported on shank 16 and is maintained thereagainst by a flat spring 30. The cartridge may be moved laterally back and forth on the shank to several fixed positions each determined by a dimple 45 adapted to receive a ball-detent 46 resiliently urged against the shank by spring 47. By moving the cartridge forward, slide 27 is moved toward the hook of shank 16 to close the jaw about the component part thus placing magazine 17 into fastening position on locating pin 28. Retracting the cartridge opens the jaw for mounting or removing the tool from the locating pin. A general understanding of these relative positions may be had by comparing FIGS. 4 and 5.

The cartridge contains a cylindrical bore 48 in its lower portion extending the length thereof and axially aligned with barrel 38. The bore is adapted to accommodate a slidable ram 49 operatively connected to a hydraulic piston 50. The ram includes a ram rod 51 extending through the bore into barrel 38 behind the fastener 37. The driving end of the ram rod 53 is reduced slightly in diameter to move freely within the barrel exit 41 and has a conical tip to engage an indentation in the end of the fastener 37. Actuating the piston by operation of the pushbuttons as aforesaid causes the ram to move laterally within the bore. When the ram is moved forward end 53 of the rod forces a compressed ejection of pin 37 through barrel exit 41. The pin, while being driven, passes through opening 26 forcing the pre-inserted locating pin 28 out through the fastener holes on the opposite side of the machine parts.

Ram travel is limited in its stroke or furthest forward advance by means of a vertical slide-guide 60 that includes a finger grip 61 for positioning the guide into either of two positions determined by dimples 62 which are adapted to receive a resilient detent 64 on the under side of the finger grip. As shown in the position of FIG. 4, guide 60 has an opening 63 defined to pass the rod but to stop the ram at shoulder 65. By sliding the finger grip to an upper dimple position, guide 60 is moved upwardly and shoulder 65 will pass through the openings and the ram will be stopped as the shoulder abuts the back side of guide 36. By providing this variation of stroke, two different size sheave hubs can conveniently be accommodated without further tool adjustment. In a similar manner any feasible number of different hub sizes can be accommodated.

The ram is held in its retracted position by a pair of ball detents 72 urged into dimples 73 of the ram by springs 74 secured by set-screws 75. Piston 50 carries a plunger 70 secured thereto which glides internally of bore 76 of ram 49. The plunger has a dome-shaped end behind which is a semi-spherical recess 71. The plunger glides forward with the piston until reaching the end of the bore and thereafter forces the ram forward overcoming the detaining force of detent 72. As the ram begins to move, balls 77, which are held in openings 78, are forced out of recess 79 into recess 71 of the plunger.

By this means, the plunger and ram are retractably coupled and retraction of the ram is ensured when the direction of piston travel is reversed by operation of the pushbuttons as aforesaid. As the piston is retracted, the ram is withdrawn therewith by virtue of their coupling, and when the ram reaches the detent position of detent 73, it is impeded from further movement while balls 77 retreat into their recess 79.

To replace or service the ram, the cartridge is moved forward in the absence of any machine parts in the jaw, and collar 84 can be removed by removing screws 85. With the collar removed, the plunger can be separated from the ram and the ram withdrawn through a sufficiently large open space between the cartridge 29 and hydraulic unit 40 formerly occupied partially by the collar.

The hydraulic unit 40 contains the hydraulically actuated piston 50 and is a commercial unit marketed by Oil Dyne Inc. of Chicago, Illinois. The unit is available in a variety of style types with optional bore diameters and piston strokes and for one application of the tool a style 8 having a ¾" bore with a 4" stroke was found suitable. Mounted on the unit are hose adapters 86 and 87 to receive hoses 19 and 20 which deliver oil respectively for retracting the piston and for moving the piston forward. The unit is secured to the tool by means of support members 88 and 89. Whereas a hydraulic unit has been utilized in the preferred embodiment of the invention, the invention is not intended to be limited thereby. Other prime moving means such as pneumatic, motor drive, or the like for driving the ram could be substituted.

An enlarged cross-sectional side view of a locating pin 28 is shown in FIG. 11. The pin is comprised of a shank 95 of smaller diameter than the fastener holes to be aligned thereby and of longer length than hub of the exterior part being connected. The shank has a cutaway portion 96 to accommodate a formed flat spring 97. As the pin is inserted into the fastener holes, the spring is depressed and forcibly retains the pin against the walls of the holes. In its proper position the ends of the shank protrude from the parts a sufficient distance to provide support for aligning the tool in operative relation.

In operation two or more machine parts to be connected each having pre-drilled fastener holes are first mounted one on the other in their assembled relation, as for example, a sheave 11 on shaft 12. Thereafter a locating pin 28 is manually inserted through the fastener holes of the parts. A fastener 37, preferably of less length than the hub diameter in which it is to be driven is loaded into magazine 17 and the tool is moved to the work area. The jaw portion of the tool is placed to straddle the sheave permitting openings 25 and 26 to rest on the protruding ends of pin 28. The cartridge is then moved forward until the magazine abuts slide 27, which together with the hook-end of shank 16, grip the sheave. Depressing pushbuttons PB–1 and PB–3 actuates pump 18 forcing piston 50 forward and on the forward stroke of ram 49, fastener 37 is forcibly compressed and ejected through barrel opening 41. The fastener continues to be driven forward by the ram until replacing pin 28 in the fastener holes. By setting finger grip 61 for the appropriate hub size, ram 49 is stopped when its conical nose just penetrates the fastener holes. Actuating PB–2 in series with PB–3 causes a retraction of the piston and withdrawal of the ram. After retraction of the cartridge the tool can be removed and the operation is completed.

By the above description there is disclosed a novel machine tool apparatus adapted to drive elongated fasteners for the connection of machine parts. The fastener is driven under pressure without exerting pressure on the parts of their supporting members. Any mating parts can be fastened thereby one of which need not necessarily be a cylinder or shaft.

Since many changes could be made in the above construction and many apparently widely different embodiments of this invention could be made without departing from the scope thereof, it is intended that all matter contained in the drawings and specifications shall be interpreted as illustrative and not in a limiting sense.

What is claimed is:

1. A portable tool apparatus to drive connecting fasteners into component parts to be joined, each of which parts have fastener receiving holes which have been pre-aligned into fastening relation by means of a pre-inserted protruding alignment element, said apparatus comprising a magazine adapted to be loaded with an elongated fastener to be driven, means forming a barrel to support the fastener in said magazine, said barrel having an open end through which a fastener can be ejected, jaw members adjacent the open end of said barrel, said members being operable to grip at least one of the component parts to support the part against movement in the direction in which a fastener is to be driven, means in said jaw members adapted to receive the protrusion of the alignment element whereby to align the open end of said barrel substantially coaxially with the pre-aligned receiving holes of the parts to be connected, and a fastener driving means selectively actuated to force ejection of a fastener through the open end of said barrel into the fastener receiving holes of the component parts replacing the alignment element therein.

2. Apparatus according to claim 1 including means to adjust said fastener driving means to accommodate the dimension of part to be joined in the direction of driving.

3. Apparatus according to claim 1 in which said fastener driving means comprises a hydraulically actuated ram.

4. Apparatus according to claim 1 in which the open end of said barrel is of a dimension less than the cross sectional dimension of the fastener as to compress the fastener during its ejection from said barrel.

5. A portable tool apparatus to drive connecting fasteners into component parts to be joined, each of which parts have fastener receiving holes pre-aligned by means of a locating element protruding therethrough, said apparatus comprising a magazine adapted to be loaded with an elongated fastener to be driven, means forming a barrel to support the fastener in said magazine, said barrel having an open end through which a fastener can be ejected, jaw members adjacent the open end of said barrel having means adapted to mount on the protruding portions of the locating element whereby the open end of said barrel aligns coaxially with the pre-aligned fastener receiving holes of the component parts to be connected, said jaw members being operable to grip at least one of the component parts in said last-recited relation to support the part against movement in the direction in which a fastener is to be driven, and a fastener driving means selectively actuated to force ejection of the fastener through the open end of said barrel to replace the locating element in the fastener receiving holes.

6. A portable tool apparatus to drive connecting fasteners into component parts to be joined, each of which parts have fastener receiving holes pre-aligned by means of a locating element protruding therethrough, said apparatus comprising a magazine adapted to be loaded with an elongated fastener to be driven, means forming a barrel to support the fastener in said magazine, said barrel having an open end through which a fastener can be ejected, jaw members adjacent the open end of said barrel having means adapted to mount on the protruding portions of the locating element whereby the open end of said barrel aligns coaxially with the pre-aligned fastener receiving holes of the component parts to be connected, said jaw members being operable to grip at least one of the component parts in said last-recited relation to support the part against movement in the direction in which a fastener is to be driven, a fastener driving means selectively actuated to force ejection of the fastener through the open end of said barrel into the fastener receiving holes to replace the locating element therein, and means to actuate said fastener driving means reversibly from said last-recited means whereby said fastener driving means is removed to a pre-driving position.

7. A portable tool apparatus to drive connecting fasteners into component parts to be joined, each of which parts have fastener receiving holes which have been pre-aligned into fastening relation by means of a pre-inserted protruding alignment element, said apparatus comprising an elongated body portion terminating in a bend at one end, a magazine movably spaced from said end of the body to form with said end closable jaw members, said magazine being adapted to be loaded with an elongated fastener to be driven, means forming a barrel to support the fastener in said magazine, said barrel having an open end through which a fastener can be ejected, means to grip at least one of the component parts in said jaw members to support the part against movement in the direction in which a fastener is to be driven, means part of said jaw members adapted to receive the protrusion of the alignment element whereby to align the open end of said barrel substantially coaxially with the pre-aligned receiving holes of the parts to be connected, fastener driving means reciprocally supported coaxially with said barrel, and means to actuate said fastener driving means against said fastener to force ejection through the open end of said barrel into the fastener receiving holes of the component parts replacing the alignment element therein.

8. A portable hand operated tool apparatus to drive connecting fasteners into component parts to be joined, each of which parts have fastener receiving holes pre-aligned by a manually pre-inserted locating element of a length greater than the length dimension of a fastener hole in which a fastener is to be received as to be protruding outward therethrough, said tool apparatus comprising an elongated shank terminating at one end in a bend having a recess for mounting on the protruding length of locating element extending outward in one direction of a part to be joined, a magazine adapted to be loaded with a connecting fastener to be driven, means forming a barrel to support the fastener in said magazine, said barrel having an open end through which a fastener can be ejected, second mounting means connected to said magazine and having a recess for mounting on the protruding length of the locating element on the part side opposite the side of said first mounting means and adjacent said barrel opening, said mounting means together forming a closable jaw to grip on a part to be fastened while the recesses thereof are substantially aligned with each other and with the opening of said barrel, and hydraulically actuated means to force ejection of a fastener from said barrel into the fastener receiving holes of the component parts to replace a locating element therein.

9. Apparatus according to claim 8 including means to adjust a fastener driving means to accommodate the dimension of part to be joined in the direction of driving.

10. Apparatus according to claim 8 in which said fastener driving means includes a reversibly operated hydraulically actuated ram.

11. The apparatus according to claim 8 in which the open end of said barrel is of a dimension less than the cross sectional dimension of the fastener as to compress a fastener during its ejection from said barrel.

References Cited in the file of this patent

UNITED STATES PATENTS

| | | |
|---|---|---|
| 1,274,216 | Tozzi | July 30, 1918 |
| 1,274,465 | Stevens | Aug. 6, 1918 |
| 2,310,638 | Hubbard | Feb. 9, 1943 |
| 2,448,833 | Royer | Sept. 7, 1948 |
| 2,955,290 | McNeill | Oct. 11, 1960 |

FOREIGN PATENTS

| | | |
|---|---|---|
| 237,253 | Germany | Aug. 2, 1911 |
| 785,320 | France | May 13, 1935 |